US011198387B1

(12) United States Patent
Matsu et al.

(10) Patent No.: US 11,198,387 B1
(45) Date of Patent: Dec. 14, 2021

(54) HEAT DISSIPATION OF A LIGHT BAR ASSEMBLY OF A STEERING WHEEL

(71) Applicant: Autoliv ASP, Inc., Ogden, UT (US)

(72) Inventors: Richard L. Matsu, Plymouth, MI (US); Brian Tebelman Shellabarger, Detroit, MI (US); Julien Tudor, Shelby Township, MI (US); Werner Eckardt, Rochester, MI (US); Stephen Camm, Port Huron, MI (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 17/116,841

(22) Filed: Dec. 9, 2020

(51) Int. Cl.
| | |
|---|---|
| *B60Q 3/283* | (2017.01) |
| *F21V 29/70* | (2015.01) |
| *B62D 1/06* | (2006.01) |
| *F21V 23/00* | (2015.01) |
| *F21W 106/00* | (2018.01) |
| *F21Y 115/10* | (2016.01) |

(52) U.S. Cl.
CPC ............. *B60Q 3/283* (2017.02); *B62D 1/06* (2013.01); *F21V 23/005* (2013.01); *F21V 29/70* (2015.01); *F21W 2106/00* (2018.01); *F21Y 2115/10* (2016.08)

(58) Field of Classification Search
CPC . B60Q 3/20; B60Q 3/283; B60Q 3/62; B60Q 3/70; B62D 1/00–286; F21V 3/00; F21V 23/005; F21V 29/70; F21W 2106/00; F21Y 2115/10; G02B 6/0035; G02B 6/0045; G02B 6/005
USPC ..................................... 362/37–60
See application file for complete search history.

(56) References Cited

U.S. PATENT DOCUMENTS

| | | | |
|---|---|---|---|
| 8,841,929 B2 | 9/2014 | Bennett et al. | |
| 8,918,252 B2 | 12/2014 | Frojdh et al. | |
| 9,233,638 B2 | 1/2016 | Lisseman et al. | |
| 9,248,851 B2 | 2/2016 | Vantzelfde et al. | |
| 9,308,856 B2 | 4/2016 | Lisseman et al. | |
| 9,308,857 B2 | 4/2016 | Lisseman et al. | |
| 9,533,687 B2 | 1/2017 | Lisseman et al. | |
| 9,815,406 B2 | 11/2017 | Lisseman et al. | |
| 9,821,703 B2 | 11/2017 | Lisseman et al. | |
| 9,873,446 B2 | 1/2018 | Gardner et al. | |
| 10,036,843 B2 | 7/2018 | Lisseman | |
| 10,046,786 B2 | 8/2018 | Lisseman et al. | |
| 10,059,250 B2 | 8/2018 | Lisseman et al. | |
| 10,179,541 B2 | 1/2019 | Lisseman et al. | |
| 2012/0283914 A1 | 11/2012 | Karwaczynski | |

(Continued)

FOREIGN PATENT DOCUMENTS

| | | |
|---|---|---|
| CN | 208101827 | 11/2018 |
| CN | 111169525 | 5/2020 |

(Continued)

OTHER PUBLICATIONS

US 9,776,551 B2, 10/2017, Lisseman et al. (withdrawn)

*Primary Examiner* — Jason M Han
(74) *Attorney, Agent, or Firm* — Stoel Rives LLP

(57) ABSTRACT

Light bar assemblies configured to be mounted at a rim of a steering wheel of a vehicle are disclosed. The light bar assemblies can include components of a driver monitoring system. The light bar assembly includes a PCB bar having a plurality of visible and infrared LEDs and a LED driver. The PCB bar is coupled to a support plate of an outer shell surrounding the PCB bar. The support plate transfers heat generated by the LEDs and LED driver away from the PCB bar.

20 Claims, 5 Drawing Sheets

(56) References Cited

U.S. PATENT DOCUMENTS

| | | |
|---|---|---|
| 2014/0109719 A1 | 4/2014 | Lisseman et al. |
| 2014/0111324 A1 | 4/2014 | Lisseman et al. |
| 2014/0111325 A1 | 4/2014 | Lisseman et al. |
| 2014/0224040 A1 | 8/2014 | Vantzelfde et al. |
| 2016/0025281 A1 | 1/2016 | Gardner et al. |
| 2016/0185354 A1 | 6/2016 | Lisseman et al. |
| 2016/0188987 A1 | 6/2016 | Lisseman et al. |
| 2016/0191859 A1 | 6/2016 | Lisseman |
| 2016/0311366 A1 | 10/2016 | Lisseman |
| 2018/0208111 A1 | 7/2018 | Lisseman et al. |
| 2018/0237050 A1 | 8/2018 | Gardner et al. |
| 2019/0275935 A1 | 9/2019 | Lisseman et al. |
| 2020/0001782 A1 | 1/2020 | Kamei et al. |

FOREIGN PATENT DOCUMENTS

| | | |
|---|---|---|
| DE | 102011112134 | 3/2013 |
| DE | 102016123786 | 6/2017 |
| DE | 102016123793 | 6/2017 |
| DE | 102017218402 | 4/2019 |
| DE | 102018200591 | 7/2019 |
| JP | 2010241275 | 10/2010 |
| JP | 2010241276 | 10/2010 |
| JP | 2017109520 | 6/2017 |
| WO | 2010113551 | 10/2010 |
| WO | 2017116898 | 7/2017 |
| WO | 2018129189 | 7/2018 |

HEAT DISSIPATION OF A LIGHT BAR ASSEMBLY OF A STEERING WHEEL

TECHNICAL FIELD

The present disclosure relates generally to the field of steering wheels. More specifically, the present disclosure relates to heat dissipation of a light bar assembly of a steering wheel, and in some embodiments a light bar assembly of a steering wheel mounted driver monitoring system.

BACKGROUND

A steering wheel of a vehicle is a prominent component of a vehicle. A steering wheel is disposed forward of a driver (or operator occupant) of the vehicle for easy and clear access by the driver. Steering wheels historically have been rather simple and clean with a single purpose of allowing the driver to direct a vehicle, though more recently there has been proliferation of buttons and switches on steering wheels for providing driver inputs to the vehicle systems. Even more recently, the steering wheel has been identified as a close and prominent feature for monitoring and/or communicating with a driver. For example, illumination features and haptic features can provide information and/or feedback from the vehicle to the driver. A steering wheel may also be well positioned for mounting of sensors and monitoring devices to monitor a driver.

A steering wheel mounted driver monitoring system (DMS) may monitor a driver when a vehicle is in motion. The DMS may monitor the driver for signs of distraction, drowsiness, etc. that may lead to a vehicular accident causing harm or death to the occupants of the vehicle. The DMS may detect a direction of the driver's head and/or eyes as signs of distraction and drowsiness. Additionally, the DMS may detect eye blink frequency as a sign of distraction and drowsiness. The DMS may also monitor the driver when an autonomous or a semi-autonomous control system of the vehicle is engaged. The DMS may provide visual, audible, and/or physical alerts, warnings, or automatically disengage the semi-autonomous control system if driver distraction or drowsiness is detected. Some steering wheel mounted DMS suffer from one or more drawbacks or may perform less than optimally in one or more respects. Certain embodiments disclosed herein can address one or more of these issues.

BRIEF DESCRIPTION OF THE DRAWINGS

The present embodiments will become more fully apparent from the following description and appended claims, taken in conjunction with the accompanying drawings. Understanding that the accompanying drawings depict only typical embodiments, and are, therefore, not to be considered limiting of the scope of the disclosure, the embodiments will be described and explained with specificity and detail in reference to the accompanying drawings.

DETAILED DESCRIPTION

Figure 1:
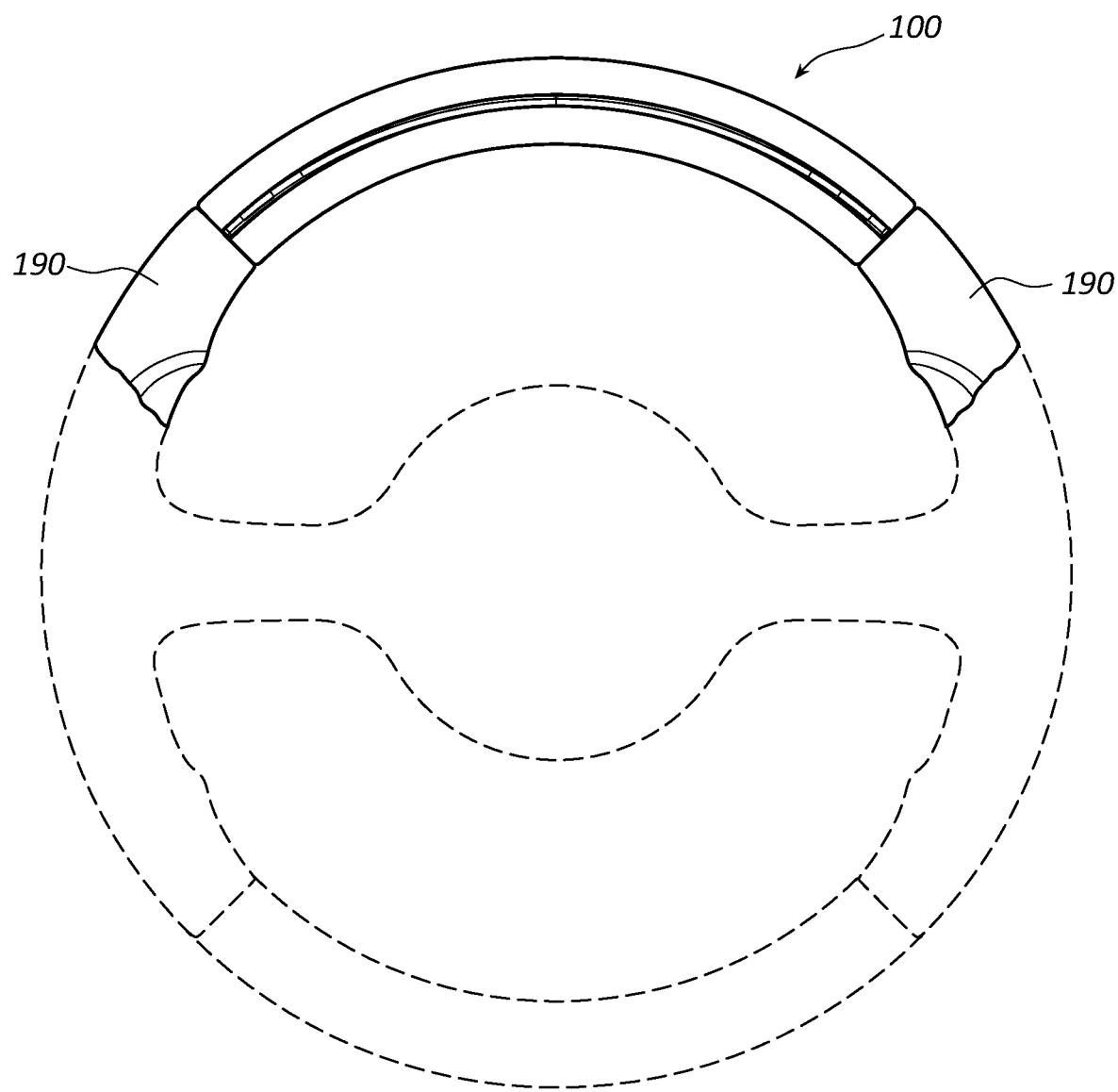
FIG. 1 is a front view of a light bar assembly mounted to a steering wheel, according to one embodiment of the present disclosure.

As can be readily understood, the components of the embodiments as generally described and illustrated in the figures herein could be arranged and designed in a wide variety of different configurations. Thus, the following more detailed description of various embodiments, as represented in the figures, is not intended to limit the scope of the disclosure, as claimed, but is merely representative of various embodiments. While the various aspects of the embodiments are presented in drawings, the drawings are not necessarily drawn to scale unless specifically indicated.

A steering wheel of a vehicle is a prominent component of a vehicle disposed forward of a driver of the vehicle for ease of access to operate the vehicle, and more specifically to control direction of the vehicle. Steering wheels have typically been simple with a single purpose of providing the driver a means to direct a vehicle, though more recently buttons and switches have begun to appear on steering wheels for providing driver inputs to the vehicle (e.g., to the sound system or audio visual system, cruise control, bluetooth connected phone or other device, and vehicle dashboard display). Even more recently, the steering wheel has been identified and utilized as a close and prominent feature for providing signals to or otherwise communicating with the driver and for monitoring a driver. For example, illumination features and haptic features have been incorporated to provide information and/or feedback from the vehicle to the driver. A steering wheel may also be well positioned for mounting of sensors and monitoring devices to monitor a driver.

Driver monitoring systems (DMS) are used to reduce or minimize vehicular accidents due to drowsy or distracted driving. DMS have been mounted at various locations within a vehicle, including, but not limited to, the steering wheel, the dashboard and/or instrument panel, or in an overhead position. In the following disclosure, "DMS" generally refers to a driver monitoring system that is typically mounted to the steering wheel, although the principles discussed may apply to other types of driver monitoring systems installed at other locations within a vehicle. A DMS can include a light bar assembly. Alternatively or in addition, a light bar assembly can include components of a DMS.

As used herein, the terms "dashboard" and "instrument panel" refer to a protruding region of a vehicle faced by a motor vehicle occupant, which often includes a glove compartment in a portion thereof that faces a passenger and may include instruments (e.g., radio and/or climate controls) in a more central region thereof, although such instruments need not be present.

The phrase "coupled to" is broad enough to refer to any suitable coupling or other form of interaction between two or more entities, including mechanical, fluidic and thermal interaction. Thus, two components may be coupled to each other even though they are not in direct contact with each other. The phrases "attached to" or "attached directly to" refer to interaction between two or more entities which are in direct contact with each other and/or are separated from each other only by a fastener of any suitable variety (e.g., mounting hardware or an adhesive).

The disclosed light bar assemblies are typically mounted to a portion of a rim of a steering wheel using a housing having two mating shells. A wrapping or covering covers an exterior surface of the shells. A lens is disposed within a slit between the two portions of the wrapping such that the lens abuts the wrapping to prevent leakage of light between the lens and the wrapping. The light bar assembly may facilitate illumination of a driver's face with infrared (IR) light from IR light emitting diodes (LEDs) such that a camera can detect the driver's face and eyes. The light bar assembly can also transmit visible light from visible LEDs to provide an indication of the DMS status.

In other embodiments, a light bar assembly may be incorporated into a rim of a steering wheel to provide feedback and/or communicate information to a driver of a vehicle. The light bar assembly may emit light colors and/or patters to display or communicate status and/or other information about the vehicle and/or the environment surrounding the vehicle.

FIGS. 1-5 illustrate different views of light bar assemblies and related components according to various embodiments of the present disclosure. In certain views each device may be coupled to, or shown with, additional components not included in every view. Further, in some views only selected components are illustrated, to provide detail into the relationship of the components. Some components may be shown in multiple views, but not discussed in connection with every view. Disclosure provided in connection with any figure is relevant and applicable to disclosure provided in connection with any other figure or embodiment.

Figure 2:
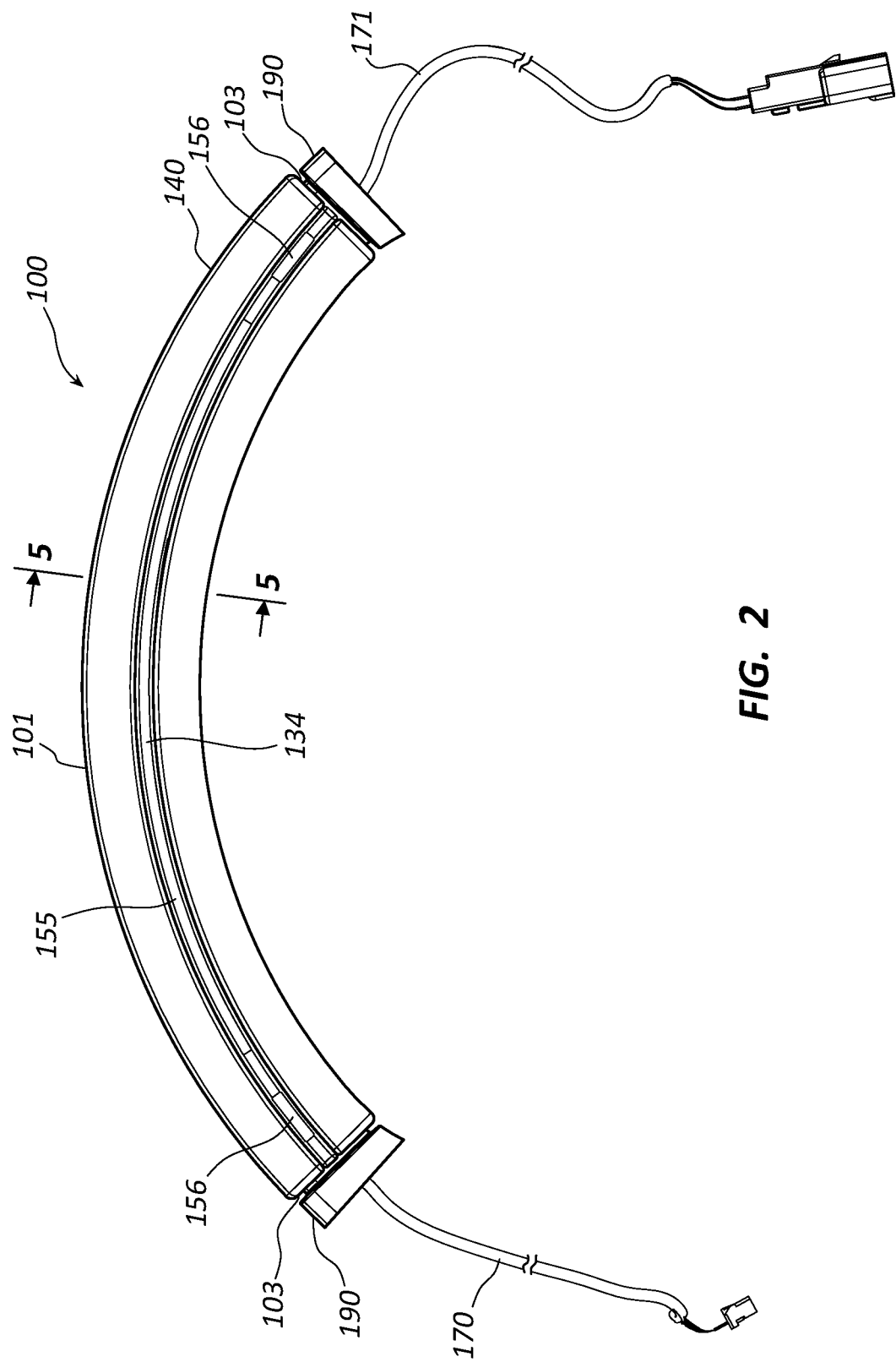
FIG. 2 is a front view of the light bar assembly of FIG. 1.
Figure 3:
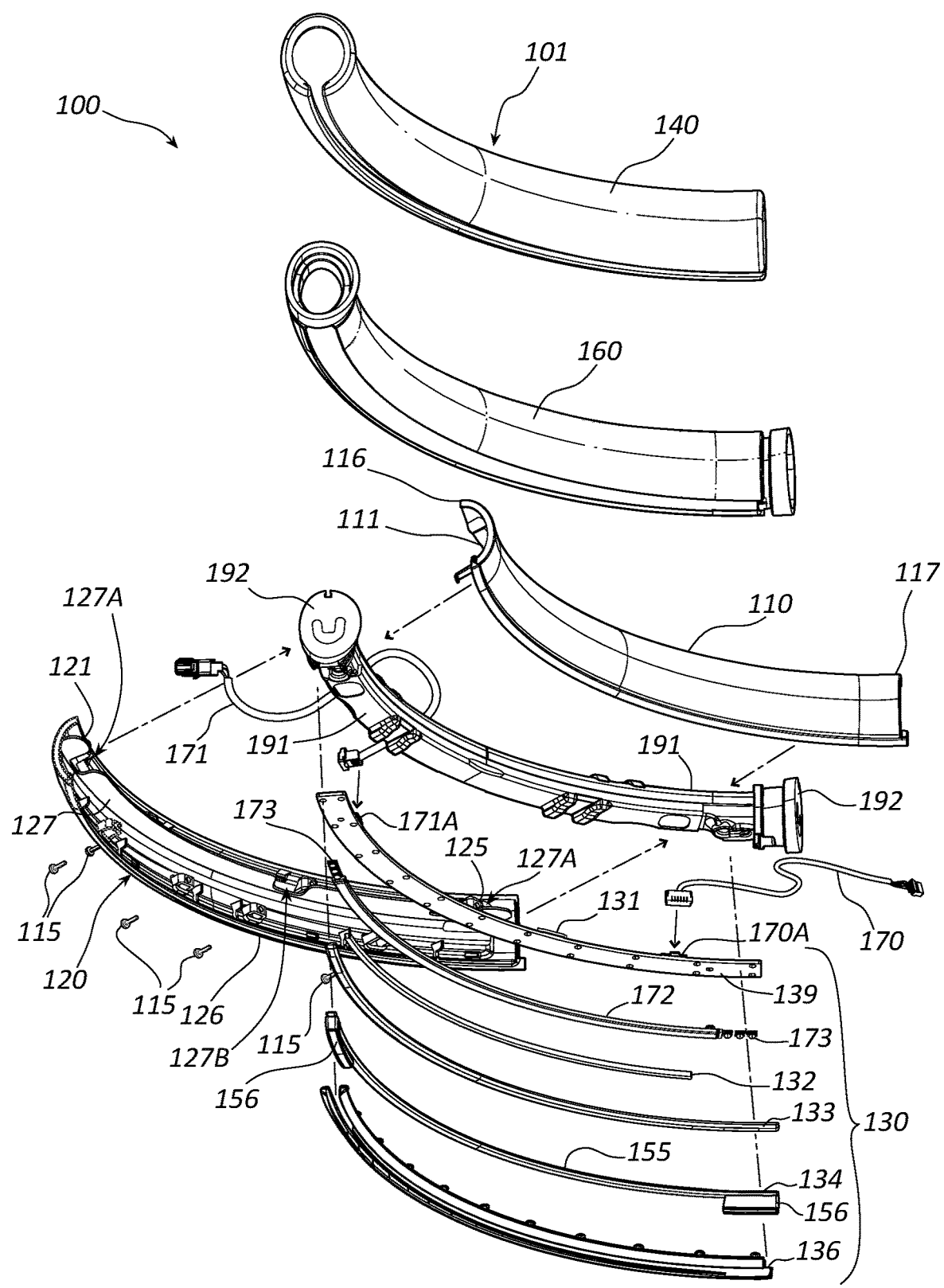
FIG. 3 is an exploded view of certain components of the light bar assembly of FIG. 1.
Figure 4:
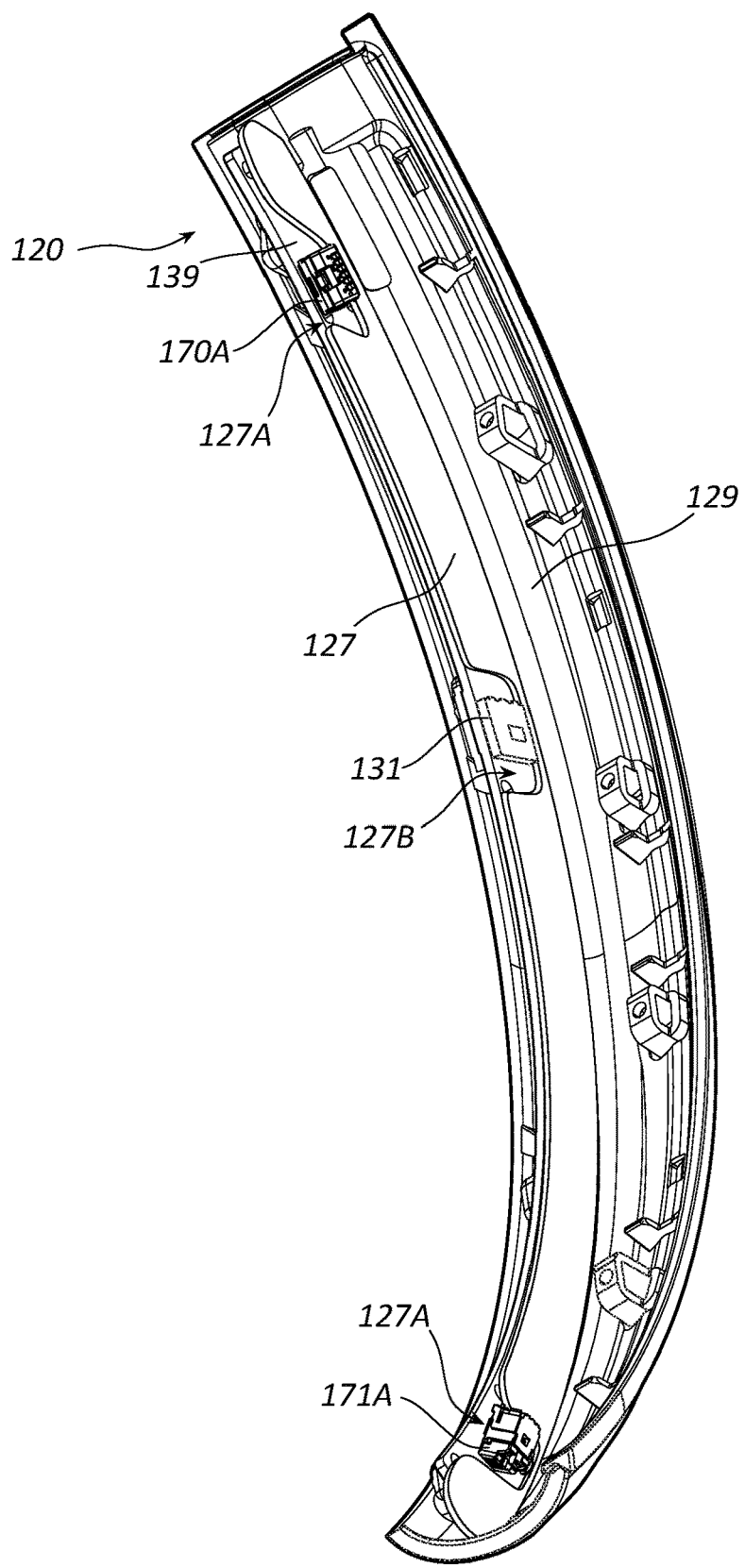
FIG. 4 is a perspective view of an outer shell of the light bar assembly of FIG. 1.
Figure 5:
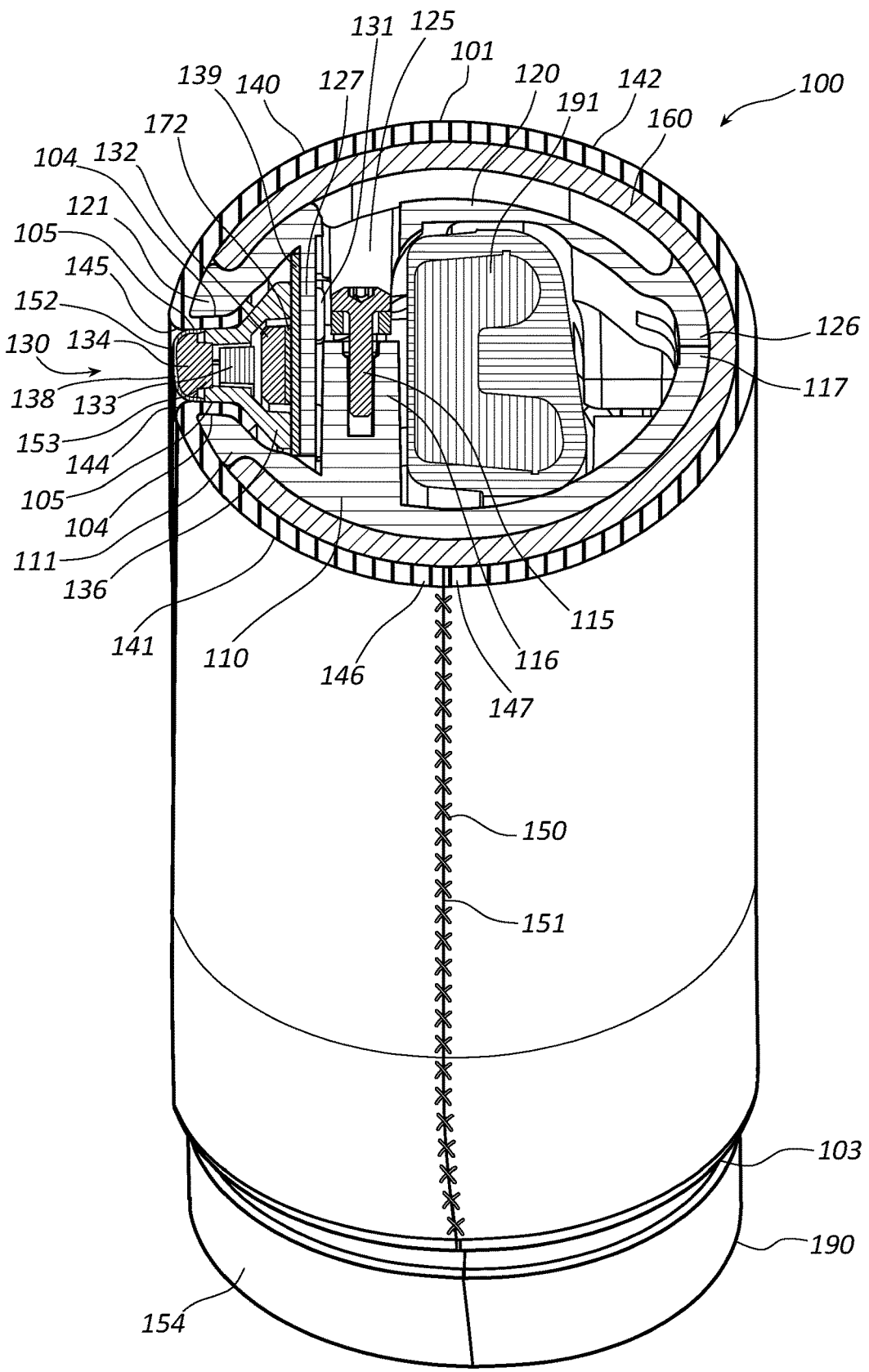
FIG. 5 is a cross-sectional view of the light bar assembly of FIG. 1.

FIGS. 1-5 depict a light bar assembly 100 according to one embodiment of the present disclosure. FIG. 1 is a front view of a light bar assembly 100 mounted to a steering wheel 190, according to one embodiment of the present disclosure. FIG. 2 is a front view of the light bar assembly 100 of FIG. 1. FIG. 3 is an exploded view of certain components of the light bar assembly 100 of FIG. 1. FIG. 4 is a cross-sectional view of the light bar assembly 100 of FIG. 1. FIG. 5 is a perspective view of an outer shell of the light bar assembly 100 of FIG. 1.

In the illustrated embodiment of FIG. 1, the light bar assembly 100 is coupled to a steering wheel 190 such that the light bar assembly 100 partially forms a portion of the steering wheel 190. The light bar assembly 100 is mounted to an upper portion of the steering wheel 190. In other embodiments, the light bar assembly 100 may be disposed at any suitable location on the steering wheel 190. For example, the light bar assembly 100 can be positioned on either side portion 193 or bottom portion 194 of the steering wheel 190. In another embodiment, the light bar assembly 100 may define an entire circumference of the steering wheel 190.

As depicted in FIG. 2, the light bar assembly 100 can include a body 101, a first or inner shell 110, a second or outer shell 120, a printed circuit board (PCB) assembly 130, a lens 134, a wrapping or covering 140, a pad member 160, a visible LED harness 170, and an IR LED harness 171. The body 101 is shown in FIG. 2 to have an elongate arcuate shape and extend between tuck grooves 103. The arcuate shape may include an arc length of about 20 mm to about 300 mm. In some embodiments, the body 101 may have any suitable elongate shape, such as straight, angled, etc. to accommodate a steering wheel having a D-shape, rectangular shape, yokes, etc. As shown in FIG. 2, the lens 134 includes an elongate arcuate shape similar to the elongate arcuate shape of the body 101. The lens 134 is disposed within the light bar assembly 100 such that it is directed toward the driver of the vehicle.

The wrapping 140 is depicted in FIG. 2 to cover the body 101 between the side portions 193 of the steering wheel 190 except where the lens 134 is disposed within the light bar assembly 100. In some embodiments, the wrapping is adhered or coupled to an exterior surface of the inner and outer shell members 110, 120. The wrapping 140 can be tucked into the tuck grooves 103 adjacent each end of the body 101. The tuck grooves 103 may hide ends of the wrapping 140 to create an aesthetically pleasing appearance and to prevent the ends from catching on a vehicle driver's hand as the steering wheel 190 is turned. The wrapping 140 can include a single elongate strip, two elongate strips, three elongate strips, or more elongate strips as will be discussed below. The wrapping 140 of the embodiment illustrated in FIG. 2 may include a leather material. In other embodiments, the wrapping 140 can be formed of any suitable, non-visible light transmissive material, such as natural leather, vinyl, synthetic leather, microfiber synthetic leather, polysuede, etc.

As shown in FIG. 2, the visible LED harness 170 and the IR LED harness 171 are shown to extend from ends of the body 101. Within the body 101, the visible and infrared (IR) LED harnesses 170, 171 are coupled to a PCB assembly 130 (shown in FIG. 3). Exterior to the body 101, the visible and IR LED harnesses 170, 171 are passed into the steering wheel 190 and coupled to a processor (not shown) disposed remotely from the PCB assembly 130 and coupled to an electronic control unit (ECU). The processor can be configured to control activation of visible LEDs 172 and IR LEDs 173 coupled to the PCB assembly 130. For example, the processor can receive data from the ECU and transmit a signal to the visible LEDs 172 to illuminate a desired color. The processor can also receive data from the ECU and transmit a signal to the IR LEDs to illuminate the face of the driver of the vehicle. The processor is disposed remotely from the PCB assembly to reduce heat generated by the PCB assembly.

FIG. 3 is an exploded view of certain components of the light bar assembly 100 and depicts that the inner shell 110 may be disposed at an inner circumference of the body 101 and the outer shell 120 may be disposed at an outer circumference of the body 101. When assembled, the inner and outer shells 110, 120 can surround a portion of a rim 191 of an armature 192 of the steering wheel 190 and can be mounted to the rim 191. In some embodiments, the light bar assembly 100 is configured to couple at each end of the light bar assembly 100 to the armature 192 of the steering wheel 190 to complete a gap in the rim 191 of the steering wheel 190. The inner and outer shells 110, 120 may be coupled together using any suitable technique to define a support structure of the light bar assembly 100 and at least partially define a portion of an outer circumference of a steering wheel 190. For example, the inner and outer shells 110, 120 can be coupled using fasteners, heat welding, ultrasonic welding, vibration welding, heat staking, bonding, etc. In the illustrated embodiment of FIG. 3, the inner and outer shells 110, 120 may be coupled or affixed by fasteners 115 (e.g., screws). The inner and outer shells, 110, 120 may be formed of any suitable material, such as polycarbonate, acrylonitrile butadiene styrene (ABS), polyamide, polyethylene terephthalate, aluminum, magnesium, PC/ABS, polybutylene terephthalate, etc.

The inner shell 110 can include an elongate arcuate shape and a semi-circular transverse cross-sectional shape. The inner shell 110 may include a slot edge 111 and an abutting edge 117 disposed opposite of the slot edge 111. The outer shell 120 can include an elongate arcuate shape and a semi-circular transverse cross-sectional shape as shown in FIG. 4. The outer shell 120 may include a slot edge 121 and an abutting edge 126 disposed opposite of slot edge 121. When assembled, as depicted in FIG. 4, the slot edge 111 of the inner shell 110 may be configured to align with the slot edge 121 of the outer shell 120 and may define a slot 104 disposed between the slot edges 111, 121. The slot 104 can be disposed on a vehicle-rearward facing surface of the light bar assembly 100. A width of the slot 104 may range from about 2 mm to about one half of a circumference of the body 101. Additionally, when assembled, the abutting edges 117, 126 can be disposed such that they abut or contact each other.

The PCB assembly 130 may be disposed, at least partially, within the assembled inner and outer shells 110, 120 and may extend along a length of the inner and outer shells 110, 120. The PCB assembly 130 can include a PCB bar 139, a LED driver 131 mounted to the PCB bar 139 and configured to drive the visible LEDs 172 and/or the IR LEDs 173 mounted to the PCB bar 139, a light guide 132, a diffuser or intermediate lens 133, a lens 134, and a housing 136. The PCB bar 139 may have an accurate shape that conforms with the shape of the outer shell 110. In other words, the LEDs are not disposed within the slot 104. The LED driver 131 can be any suitable automotive grade, multichannel LED driver. For example, the LED driver 131 may be a Texas Instrument TPS929120 12 channel 40-V high-side LED driver or any other suitable LED driver.

The visible LEDs 172 may be of any suitable type. For example, the visible LEDs 172 may include RGB chips configured to emit red (625 nm), green (528 nm), and blue (465 nm) light. The RGB chips can be tuned such that the visible LEDs 172 emit one or more of a plurality of colors through color mixing of red, green and blue colors. The number of visible LEDs 172 can range from two to 16 or more.

The IR LEDs 173 can be configured to emit IR light having a wavelength ranging from about 800 nm to about 2500 nm and may be about 940 nm. Other suitable wavelengths may be utilized. The number of IR LEDs 173 may range from two to six or more. The IR LEDs 173 may be disposed at opposing ends of the PCB bar 139 such that they are spaced approximately 20 mm to 300 mm apart. The visible and IR LEDs 172, 173 may generate heat in addition to generating visible and IR light. The heat, if retained by the visible and IR LEDs 172, 173, may cause the illumination properties of the visible and IR LEDs 172, 173 to change. For example, an elevated ambient temperature may reduce the illumination output from the visible and IR LEDs 172, 173. Additionally, an elevated ambient temperature may reduce the useful life of the visible and IR LEDs 172, 173.

The PCB bar 139 may be thermally coupled to and supported by a PCB support plate 127 as illustrated in FIG. 3. The PCB support plate 127 may serve multiple functions, such as supporting the PCB bar 139 and dissipating heat generated by the PCB bar 139. The PCB support plate 127 may comprise a plurality of recesses to create space for various component of the PCB bar 139. In the illustrated embodiment, the PCB support plate 127 comprises recesses 127A on opposing ends of the PCB support plate 127. The recesses 127A allow plugs 170A and 171A for the visible LED harness 170 and the IR LED harness 171 to protrude through the PCB support plate 127. Accordingly, the visible LED harness 170 and the IR LED harness 171 may plug into the PCB board 139 when supported by the PCB support plate 127.

The PCB support plate 127 may further comprise another recess 127B. In the illustrated embodiment, the recess 127B is disposed near the center of the PCB support plate 127. The recess 127B allows for the LED driver 131 to protrude through the support plate 127.

FIG. 4 depicts a detailed view of the outer shell 120 that includes the PCB support plate 127 supporting the PCB bar 139. The PCB support plate 127 dissipates heat generated by the visible and IR LEDs 172, 173 such that the visible and IR LEDs 172, 173 may be maintained at a relative constant operational temperature. The PCB bar 139 may be coupled to, or thermally coupled to the PCB support bar 127. In other words, the support plate 127 can act as a heat sink configured to transfer heat away from the visible and IR LEDs 172, 173 to the outer shell 120 and to be dissipated to an external environment. In other embodiments, the support plate 127 may be associated with an inner shell 110 (not shown).

As illustrated in FIG. 4, the support plate 127 may extend radially inward from an internal surface 129 of the outer shell 120 and include an elongate arcuate shape. The PCB bar 139 can be thermally coupled to or otherwise disposed on the support plate 127 such that heat generated by the visible and IR LEDs 172, 173 is transferred to the support plate 127 and dissipated throughout the light bar assembly 100 and/or to an external environment. The PCB support plate 127 may be shaped to correspond with the PCB bar 139 and may be coextensive with a length of the PCB bar 139. In some embodiments, the PCB bar 139 and the PCB support plate 127 comprise an arcuate shape. In the depicted embodiment of FIG. 4, the support plate 127 can be formed as an integral part of the outer shell 120 using an injection molding method. In other embodiments, the support plate 127, may be formed as a separate part and coupled or attached to the outer shell 120 using any suitable technique, such as bonding, welding, friction fit, snap fit, etc.

In certain embodiments, the support plate 127 is formed of the same material as the outer shell 120. In some embodiments, the support plate 127 and the outer shell 120 may be unitary and in other embodiments the support plate 127 may be coupled to the outer shell 120. In other embodiments, the support plate 127 is formed of material that has a high thermal conductivity. For example, the support plate 127 may be formed of aluminum, copper, etc. In some embodiments, a thermal conductive pad, grease, or paste 128 may be disposed between the PCB bar 139 and the support plate 127 to facilitate the transfer of heat. The thermal conductive pad 128 may be formed of any suitable material that has a high thermal conductivity, such as aluminum, copper, silicone elastomers, non-silicone elastomers, etc. The thermal conductive paste or grease 128 may be formed of any suitable material that has a high thermal conductivity, such as epoxies, silicones, urethanes, acrylates, etc., filled with aluminum oxide, boron nitride, zinc oxide, aluminum nitride, silicone, etc.

In some embodiments, the light bar assembly 100 may comprise a plurality of support plates. For example, as discussed above, the outer shell 120 may comprise a first PCB support plate 127 that extends radially inward from the internal surface of the outer shell 120 and is configured to support the PCB bar 139 and dissipate heat generated by the visible and IR LEDs 172, 173 such that the visible and IR LEDs 172, 173 may be maintained at a relative constant operational temperature. The inner shell 110 may comprise a second PCB support plate that extends radially inward from an internal surface of the inner shell 110. The second PCB support plate can be configured to support the PCB bar 139 and dissipate heat generated by the visible and IR LEDs 172, 173 such that the visible and IR LEDs 172, 173 may be maintained at a relative constant operational temperature. In other words, the first PCB support plate 127 and the second PCB support plate can both support the PCB bar 139, draw heat from the PCB bar 139, and dissipate the heat. The first and second support plates may sandwich the PCB bar 139 with one of the support plates being coextensive with the PCB bar 139 and the other support plate sandwiching the PCB bar 139 in locations where the no visible and IR LEDs 172, 173 are disposed. The first and second support plates may both be disposed on the same side of the PCB bar 139, either in a stacked (or overlapping) configuration or in an abutting configuration (edge-to-edge with each in abutment with a portion of the PCB bar 139). In these embodiments, the heat generated by the visible and IR LEDs 172, 173 may be transferred away from the LEDs 172, and 173 to the inner shell 110 and the outer shell 120 to be dissipated to the external environment. In this manner, the heat generated by the LEDs 172, 173 is dissipated over twice the surface area (e.g., the surface area of the inner shell 110 and the outer shell 120) than the surface area of the embodiment with a single support plate 127 coupled to the outer shell 120. The second PCB support plate can be formed of material similar to the first PCB support plate 127 and can also include a thermal conductive pad, grease, or paste that may be disposed between the PCB bar 139 and the support plate 127 to facilitate the transfer of heat.

FIG. 5 illustrates a transverse cross-sectional view of the light bar assembly 100. The cross-sectional view of the light bar assembly 100 provides context of how the light bar assembly 100 is assembled. The light guide 132 can have an arcuate, elongate shape as shown in FIG. 3 and a rectangular transverse cross-sectional shape as shown in FIG. 5. The light guide 132 can be disposed adjacent the visible LEDs 172 to direct the visible and IR light emitted by the visible and IR LEDs 172, 173 toward the diffuser 133. The light guide 132 may be formed from any suitable clear material. For example, the light guide 132 can be formed from poly(methyl methacrylate) (PMMA), polycarbonate, glass, etc. An Index of Refraction of the light guide 132 may range from about 1.4 to about 1.6 and may be about 1.492.

The diffuser 133 can be disposed between the light guide 132 and the lens 134. The diffuser can have an arcuate, elongate shape as illustrated in FIG. 3 and a square transverse cross-sectional shape as illustrated in FIG. 5. The light diffuser 133 may be configured to evenly distribute or diffuse the visible and/or IR light received from the light guide 132 through the diffuser 133 prior to transmittance of the light to the lens 134. The diffuser 133 can be formed of any suitable clear material, such as PMMA, polycarbonate, polyamide, etc. The diffuser 133 may be textured on its top and/or bottom surfaces to facilitate an even diffusion of light over a length of the diffuser 133. The texture can be of any suitable grade that promotes an even diffusion of light. In other embodiments, the top surface of the diffuser 133 may be configured as a Fresnel lens having curved and tilted faces.

The lens 134 may be disposed adjacent the diffuser 133 and may include an arcuate elongate shape as depicted in FIG. 3. The lens 134 can be configured to receive diffused light from the diffuser 133 and transmit the light toward the driver of the vehicle such that the visible light may be noticeable by the driver and the IR light may illuminate the driver's face. The lens 134 may be formed of PMMA, polycarbonate, or any other suitable material. An Index of Refraction of the lens 134 can range from about 1.4 to about 1.6 and can be about 1.586. A transverse cross-sectional profile of the lens 134, as shown in FIG. 5, may include a mushroom shape with a head portion 138 having a width larger than a width of a stem portion 153. The width of the head portion 138 may range from about 2 mm to about one half of the circumference of the body 101. In other embodiments, the lens 134 may be of any suitable shape, such as dome, polygonal, etc. The head portion 138 can be covered with a film 152 to provide a scratch and chemical resistant surface for the lens 134. In certain embodiments, the film 152 is formed of a polycarbonate base with an ultraviolet curable hard coat. In other embodiments, the film 152 can include a spray or dip hard coating. A bottom surface of the lens 134 may be textured in a similar manner to textured surfaces of the diffuser 133.

As depicted in FIGS. 2 and 3, the lens 134 may include a visible light transmissive portion 155 and an IR light transmissive portion 156. In the depicted embodiment of FIGS. 2 and 3, the lens 134 has two IR light transmissive portions 156 disposed at either end of the lens 134. The visible light transmissive portion 155 is disposed between the IR light transmissive portions 156. In other embodiments, the lens 134 may include more than two IR light transmissive portions 156 that are disposed at various locations along a length of the lens 134. For example, the lens 134 may include three IR light transmissive portions 156 with two IR light transmissive portions 156 disposed at either end of the lens 134 and the third IR light transmissive portion 156 disposed at about the middle of the length of the lens 134. A distance between two IR light transmissive portions 156 can range from about 20 mm to about 300 mm. The visible light transmissive portion 155 may be disposed over the visible LEDs 172 such that visible light is transmitted through the visible light transmissive portion 155. The IR transmissive portion 156 of the lens 134 may be disposed over the IR LEDs 173 such that IR light is transmitted through the IR transmissive portion 156.

The IR transmissive portion 156 may be opaque such that it is non-transmissive to visible light. In other words, the IR transmissive portion 156 can be IR light transmissive and visible light non-transmissive. The IR transmissive portion 156 may create a dead front effect of the lens 134 wherein the visible light transmissive portion 155 can be illuminated by the visible LEDs 172 and the IR transmissive portion 156 is not illuminated by the visible LEDs 172. Said another way, the visible light transmissive portion 155 may appear to be lighted or illuminated while the IR transmissive portion may appear to be dark or non-illuminated. The IR transmissive portion 156 may include a material that either absorbs or blocks visible light from being transmitted from the IR transmissive portion 156 of the lens 134. The material can be any suitable material, such as COVESTRO PC AX 2675 ST 978001. In some embodiments, the material may be dispersed throughout the IR transmissive portion 156 as a filler. In other embodiments, the material may be a film covering at least one surface of the IR transmissive portion 156.

The IR transmissive portion 156 can be coupled to the visible light transmissive portion 155 using any suitable technique. For example, in a certain embodiment, the light transmissive portion 155 is injection molded as a first shot and the IR transmissive portion 156 is injection molded as a second shot to form a continuous or unibody lens 134. In another embodiment, the light transmissive portion 155 and the IR transmissive portion 156 can be separately injection molded and then coupled together using any suitable technique, such as welding, heat bonding, adhering, etc.

A lens housing 136 may be coupled to the PCB bar 139. The lens housing 136 can be formed of any suitable material that is IR light transmissive and visible light non-transmissive. FIG. 5 illustrates that the stem portion 153 of the lens 134 can be disposed within the lens housing 136 such that it retains the stem portion 153 and the head portion 138 extends beyond the lens housing 136. The diffuser 133, light guide 132, visible LEDs, 172, and IR LEDs 173 may be disposed within the lens housing 136.

The light bar assembly 100 may be disposed around the rim 191, as illustrated in FIG. 5. The inner shell 110 and the outer shell 120 are coupled together such that they surround the rim 191. The inner shell 110 and the outer shell 120 can be coupled together using any suitable technique, such as fastening, heat welding, ultrasonic welding, vibration welding, heat staking, bonding, etc. For example, the depicted embodiment of FIG. 5 shows the inner shell 110 and the outer shell 120 coupled together using a fastener 115 (e.g. a screw). A head of the screw 115 is disposed in a screw receiver 125 of the outer shell 120 and the threads of the screw 115 are threaded into a threaded receiver 116 of the inner shell 110.

In the embodiment of FIG. 5, a first elongate strip 141 of the wrapping 140 includes a first edge portion 144. The first edge portion 144 is wrapped around the slot edge 111 and disposed or tucked into the slot 104. A second elongate strip 142 includes a second edge portion 145 that is wrapped around the slot edge 121 and disposed or tucked into the slot 104. The first and second edge portions 144, 145 define a slit 105 disposed between the first and second edge portions 144, 145. A width of the slit 105 may range from about 0.5 mm to about one half of the circumference of the body 101. A thickness of the first and second edge portions 144, 145 can range from about 0.7 mm to about 1.5 mm. In certain embodiments, the second elongate strip 142 can be an integral portion of a wrapping 154 used to wrap the steering wheel 190 outside of the light bar assembly 100. In other embodiments, the first and second elongate strips 141, 142 can be separate strips that are coupled (e.g., stitched) to each other and to the wrapping 154.

As illustrated in FIG. 5, at least a portion of the lens 134 is disposed within the slit 105 and directed vehicle-rearward toward a driver of the vehicle. The first and second edge portions 144, 145 can pinch or abut opposing sides of the head portion 138 of the lens 134 to prevent visible light transmitted by the visible LEDs 172 from leaking around the lens 134 while allowing passage of the visible light through the lens 134. In other words, the first and second edge portions 144, 145 contact the sides of the head portion 138 of the lens 134 to create a light shield that prevents visible light from passing between the lens 134 and the first and second edge portions 144, 145. The pinching may occur when the inner and outer shells 110, 120 are coupled together, and thereby the slot edge 111 of the inner shell 110 and the slot edge 121 of the outer shell 120 provide sufficient force to pinch the first and second edge portions 144, 145 against opposing sides of the lens 134.

In some embodiments, the width of the slit 105 may be smaller than the width of the head portion 138 of the lens 134 such that the first and second edge portions 144, 145 may be compressed by the lens 134 and there is little or no space or gap between the lens 134 and the first and second edge portions 144, 145. In other words, a distance between the lens 134 and the abutting covering 140 is zero mm. In certain embodiments, the lens housing 136 is not visible within the slit 105 to the driver of the vehicle. In other embodiments, a small portion of the lens housing 136 on both sides of the lens 134 may be visible to the driver of the vehicle. For example, a visible portion of the lens housing 136 may have a width of about 1.1 mm on each side of the lens 134.

FIGS. 3 and 4 illustrates an embodiment of the light bar assembly 100 including a pad or cushion 160 disposed between the wrapping 140 and the inner and outer shells 110, 120. As depicted in the embodiment of FIGS. 3 and 4, the pad 160 can surround the inner and outer shells 110, 120. In another embodiment, the pad 160 may cover the outer shell 120. The pad 160 may be formed of polymer foam, such as polyurethane foam or a natural material, such as cotton. In certain embodiments, the pad 160 can be a heat mat, a hands-on-detection (HOD) mat, or a combination of the heat mat and the HOD mat. In other embodiments, the pad 160 can be disposed between the wrapping 140 and the inner and outer shells 110, 120. In some embodiments, the light bar assembly 100 does not include the pad 160.

A method of assembling the light bar assembly 100 includes wrapping the first edge portion 144 of the first strip 141 around the slot edge 111 of the inner shell 110 and tucking the first edge portion 144 into the slot 104. The second edge portion 145 of the second elongate strip 142 is wrapped around the slot edge 121 of the outer shell 120 and tucked into the slot 104. The lens 134 is disposed into the slit 105 such that the lens 134 is pinched by the first and second edge portions 144, 145. The diffuser 133, light guide 132, reflector 137, and PCB assembly 130 are disposed within the inner and outer shells 110, 120 such that they are adjacent the lens 134. The inner and outer shells 110, 120 are disposed around the rim 191 of the steering wheel and coupled together using the fastener 115. The wrapping 140 is wrapped around the inner and outer shells 110, 120 such that the third edge 146 of the first strip 141 abuts or overlaps the fourth edge 147 of the second strip 142. The third edge 146 and the fourth edge 147 are coupled together using the stitching 150. The stitching 150 can be formed of any suitable automotive grade cordage, such as nylon thread. In other embodiments, the third edge 146 and the fourth edge 147 may be coupled together using any suitable technique, such as heat sealing, bonding, gluing, etc. In other embodiments, the seam 151 can be disposed at any suitable location around a circumference of the light bar assembly 100. For example, the seam 151 can be disposed on a bottom portion, as illustrated in FIG. 5, of the light bar assembly (e.g., to be disposed along an inner perimeter of the steering wheel).

Throughout this specification, the phrase "coupled to" refers to any form of interaction between two or more entities, including mechanical, electrical, magnetic, electromagnetic, fluid, and thermal interaction. Two components may be coupled to each other even though they are not in direct contact with each other. The terms "abut" and "abutting" refer to items that are in direct physical contact with each other, although the items may not necessarily be attached together.

The phrases "attached to" or "attached directly to" refer to interaction between two or more entities which are in direct contact with each other and/or are separated from each other only by a fastener of any suitable variety (e.g., mounting hardware or an adhesive).

The terms "a" and "an" can be described as one, but not limited to one. For example, although the disclosure may recite a light bar assembly having "a lens," the disclosure also contemplates that the light bar assembly can have two or more lens.

Unless otherwise stated, all ranges include both endpoints and all numbers between the endpoints.

As used herein, the term "rearward" is used with reference to the back of the relevant vehicle. For example, a light bar assembly that transmits light in a rearward direction transmits the light toward the back of a vehicle.

Reference throughout this specification to "an embodiment" or "the embodiment" means that a particular feature, structure or characteristic described in connection with that embodiment is included in at least one embodiment. Thus, the quoted phrases, or variations thereof, as recited throughout this specification are not necessarily all referring to the same embodiment.

Similarly, it should be appreciated that in the above description of embodiments, various features are sometimes grouped together in a single embodiment, figure, or description thereof for the purpose of streamlining the disclosure. This method of disclosure, however, is not to be interpreted as reflecting an intention that any claim require more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Recitation in the claims of the term "first" with respect to a feature or element does not necessarily imply the existence of a second or additional such feature or element. It will be apparent to those having skill in the art that changes may be made to the details of the above-described embodiments without departing from the underlying principles of the invention. Embodiments of the invention in which an exclusive property or privilege is claimed are defined as follows.

Any methods disclosed herein comprise one or more steps or actions for performing the described method. The method steps and/or actions may be interchanged with one another. In other words, unless a specific order of steps or actions is required for proper operation of the embodiment, the order and/or use of specific steps and/or actions may be modified.

References to approximations are made throughout this specification, such as by use of the term "about." For each such reference, it is to be understood that, in some embodiments, the value, feature, or characteristic may be specified without approximation.

Similarly, in the above description of embodiments, various features are sometimes grouped together in a single embodiment, figure, or description thereof for the purpose of streamlining the disclosure. This method of disclosure, however, is not to be interpreted as reflecting an intention that any claim require more features than those expressly recited in that claim. Rather, as the following claims reflect, inventive aspects lie in a combination of fewer than all features of any single foregoing disclosed embodiment.

The claims following this written disclosure are hereby expressly incorporated into the present written disclosure, with each claim standing on its own as a separate embodiment. This disclosure includes all permutations of the independent claims with their dependent claims. Moreover, additional embodiments capable of derivation from the independent and dependent claims that follow are also expressly incorporated into the present written description.

Without further elaboration, it is believed that one skilled in the art can use the preceding description to utilize the device to its fullest extent. The claims and embodiments disclosed herein are to be construed as merely illustrative and exemplary, and not a limitation of the scope of the present disclosure in any way. It will be apparent to those having ordinary skill in the art, with the aid of the present disclosure, that changes may be made to the details of the above-described embodiments without departing from the underlying principles of the disclosure herein. In other words, various modifications and improvements of the embodiments specifically disclosed in the description above are within the scope of the appended claims. Moreover, the order of the steps or actions of the methods disclosed herein may be changed by those skilled in the art without departing from the scope of the present disclosure. In other words, unless a specific order of steps or actions is required for proper operation of the embodiment, the order or use of specific steps or actions may be modified. The scope of the invention is therefore defined by the following claims and their equivalents.

The invention claimed is:

1. A light bar assembly for a steering wheel, comprising:
   an outer shell comprising a first printed circuit board (PCB) bar support plate disposed on an internal surface of the outer shell;
   an inner shell that couples to the outer shell; and
   a PCB bar comprising a visible LED and an IR LED,
   wherein the PCB bar is coupled to the first PCB bar support plate, and
   wherein the first PCB bar support plate is configured to dissipate heat from the visible and IR LEDs to the outer shell, and
   wherein an outer surface of the outer shell and an outer surface of the inner shell at least partially define an outer circumference of a portion of a steering wheel.

2. The light bar assembly of claim 1, wherein the outer shell and the first PCB bar support plate are unitary.

3. The light bar assembly of claim 1, wherein the PCB bar support plate is coextensive with a length of the PCB bar.

4. The light bar assembly of claim 1, wherein the PCB bar support plate extends inward from the internal surface of the outer shell.

5. The light bar assembly of claim 1, wherein the first PCB bar support plate comprises any one of polycarbonate, acrylonitrile butadiene styrene, aluminum, copper, and any combination thereof.

6. The light bar assembly of claim 1, further comprising a thermal conductive pad disposed between the PCB bar and the first PCB bar support plate.

7. The light bar assembly of claim 6, wherein the thermal conductive pad comprises any one of aluminum, copper, and any combination thereof.

8. The light bar assembly of claim 1, further comprising a thermal conductive grease disposed between the PCB bar and the first PCB bar support plate.

9. The light bar assembly of claim 8, wherein the thermal conductive grease comprises any one of epoxies, silicones, urethanes, acrylates, any combination thereof.

10. The light bar assembly of claim 8, wherein the thermal conductive grease comprises a thermal conductive filler.

11. The light bar assembly of claim 10, wherein the filler comprises any one of aluminum oxide, boron nitride, zinc oxide, aluminum nitride, and any combination thereof.

12. The light bar assembly of claim 1, wherein the PCB bar further comprises a plurality of visible LEDs and a plurality of IR LEDs disposed on the PCB bar.

13. The light bar assembly of claim 1, further comprising an inner shell, wherein the inner shell comprises a second PCB support plate and the PCB bar is coupled to the second PCB support plate.

14. The light bar assembly of claim 1, wherein the PCB bar further comprises an LED driver disposed on the PCB bar.

15. The light bar assembly of claim 1, further comprising a processor, wherein the processor is disposed remotely from the PCB bar.

16. A light bar assembly for a steering wheel, comprising:
    an outer shell;

an inner shell that couples to the outer shell to define a support structure of the light bar assembly, wherein an outer surface of the outer shell and an outer surface of the inner shell at least partially define an outer circumference of a portion of rim of a steering wheel;

a first printed circuit board (PCB) bar comprising a visible LED and an IR LED that is disposed within a space defined by the outer shell and the inner shell while coupled together; and a PCB bar support plate that extends from an internal surface of one of the outer shell or the inner shell, wherein the PCB bar is coupled to the first PCB bar support plate, and wherein the first PCB bar support plate is configured to dissipate heat from the visible and IR LEDs to either the outer shell or the inner shell.

17. The light bar assembly of claim 16, wherein the PCB bar comprises an arcuate shape.

18. The light bar assembly of claim 16, wherein the PCB bar support plate is shaped to correspond with the PCB bar and is coextensive with a length of the PCB bar.

19. The light bar assembly of claim 16, further comprising a thermal conductive pad disposed between the PCB bar and the PCB bar support plate.

20. The light bar assembly of claim 16, further comprising a second PCB support plate that extends from an internal surface of the inner shell, wherein the PCB support plate extends from the internal surface of the outer shell.

* * * * *